No. 694,882. Patented Mar. 4, 1902.
R. A. McCRONE.
INSECT DESTROYER.
(Application filed Sept. 11, 1901.)

(No Model.)

Witnesses:
C. D. Kesler
Dennis Sumby

Inventor
Robert A. McCrone
By James L. Norris
Atty.

UNITED STATES PATENT OFFICE.

ROBERT A. McCRONE, OF DENVER, COLORADO.

INSECT-DESTROYER.

SPECIFICATION forming part of Letters Patent No. 694,882, dated March 4, 1902.

Application filed September 11, 1901. Serial No. 75,048. (No model.)

*To all whom it may concern:*

Be it known that I, ROBERT A. MCCRONE, a citizen of the United States, residing at Denver, in the county of Arapahoe, and State of Colorado, have invented new and useful Improvements in Insect-Destroyers, of which the following is a specification.

This invention relates to insect-destroyers, and especially to that class of such devices employed for mixing together water and an insecticide and spraying the poisonous solution onto growing plants, trees, and the like to kill parasitical insects thereon; and it has for its object to provide a simple and inexpensive device of the type referred to that may be readily attached to an ordinary lawn or garden hose and so constructed that a portion only of the stream of water is initially impregnated with the insecticide, after which both the clear and impregnated portions of the stream are brought together and commingled in a mixing-chamber before they are sprayed or discharged onto the plants.

It also has for its object to combine with such an arrangement of parts an agitator for mixing the insecticide and water.

It has for its further object to provide improved means whereby the stream from the hose may be impregnated with the insecticide or discharged from the device unmixed with the insecticide at the will of the operator.

Finally, it has for its object to improve and simplify the construction and render more efficient the operation of this class of insect-destroyers generally.

To these ends my invention consists in the features and in the construction, combination, and arrangement of parts hereinafter described, and particularly pointed out in the claims following the description, reference being had to the accompanying drawings, forming a part of this specification, wherein—

Figure 1:
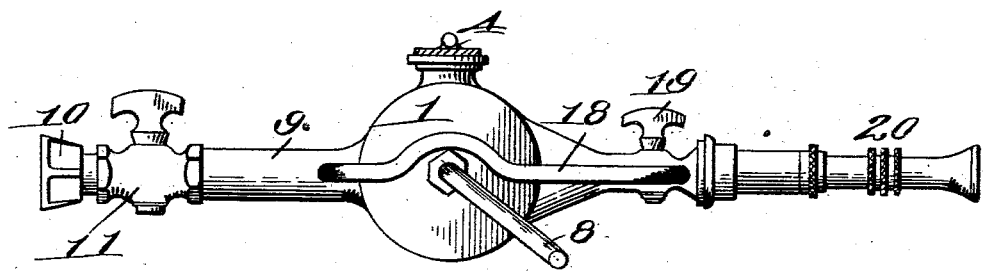
Figure 2:
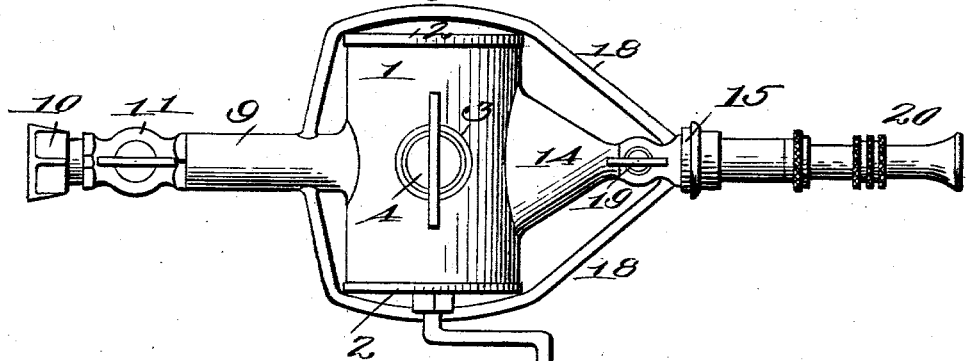
Figures 3, 4:
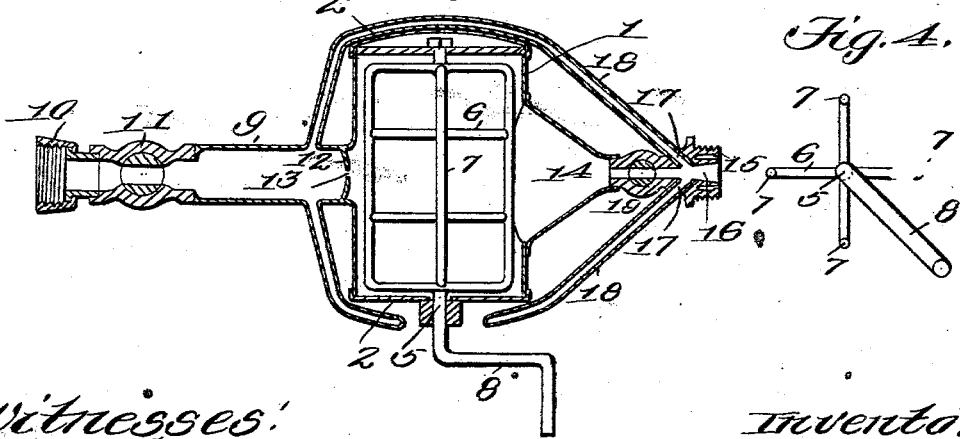

Figure 1 is a view in side elevation of my improved insect-destroyer. Fig. 2 is a top plan view thereof. Fig. 3 is a horizontal longitudinal sectional view of the same, and Fig. 4 is a detail end view of the agitator.

Referring to the drawings, numeral 1 indicates the insecticide-receptacle, shown herein as consisting of a cylindrical casing closed at its opposite ends by heads 2 and provided on its upper side with a filling-orifice 3, closed by a screw-plug 4. Arranged in the receptacle 1 is an agitator consisting of a shaft 5, passing longitudinally and centrally through the cylindrical casing and its heads 2, suitable apertures being formed in the latter to form bearings for the shaft, arms 6 projecting radially from the shaft, and beaters 7, carried by the outer ends of the radial arms 6. The agitator thus constructed constitutes a skeleton drum or dasher that may be freely revolved in the receptacle 1 and the insecticide and water contained in the latter without offering undue resistance and at the same time serves to thoroughly commingle and mix together the water and insecticide. The agitator may be conveniently turned by hand by means of a crank 8, attached to or formed integral with one end of the shaft 5.

Connected to one side of the poison-receptacle 1, intermediate the ends of the latter, is one end of a short pipe 9, the other end of which is provided with a hose-coupling 10, of ordinary or any preferred or suitable construction, by means of which the device may be readily coupled or attached to an ordinary lawn or garden hose. The pipe 9, which I term the "supply-pipe," is provided with a valve 11, of ordinary and usual construction, by means of which the supply of water to the device may be controlled or entirely shut off. The supply-pipe 9 at or near its point of connection to the poison-receptacle is provided with a diaphragm 12, having formed centrally therein a small port or perforation 13, the whole forming a contracted discharge from the supply-pipe to the poison-receptacle. The poison-receptacle on the side directly opposite to the supply-pipe is provided with a discharge-pipe 14, in the outer end of which is fitted a discharge-nozzle 15. The discharge-pipe is shown herein as being funnel-shaped to facilitate the discharge of the solution from the poison-receptable, but it will be manifest that such is not wholly essential.

In the outer end of the nozzle 15 is formed a mixing-chamber 16, provided at its inner end with two oppositely-arranged ducts or passages 17, in which are fitted the forward ends of two relatively small pipes 18. The pipes 18 pass rearwardly on opposite sides of the ends of the poison-receptacle and at their rear ends are connected to the supply-pipe 9.

The nozzle 15 is provided with a valve 19 of ordinary construction at a point in rear of the mixing-chamber 16, by means of which the discharge of the insecticide solution may be controlled or entirely shut off. An ordinary spraying or hose nozzle 20 may be attached to the discharge-nozzle 15, if desired; but the same forms no part of the present invention and may be employed or omitted, as may be preferred or found most suitable for the purpose immediately in hand.

The operation of my improved insect-destroyer is as follows: The device may be readily attached to the hose by uncoupling from the latter the usual hose-hozzle and coupling thereto my improved device, after which, if preferred, the hose-nozzle may be coupled to the discharge-nozzle, as shown in Figs. 1 and 2 of the drawings. By removing the screw-plug 4 the desired quantity of insecticide may be introduced into the receptacle through the orifice 3, after which the plug is replaced in the filling-orifice and screwed tightly therein. Any preferred insecticide may be employed for the purpose—as, for example, paris-green—or a disinfectant or antiseptic may be employed, the nature of the material used forming no part of the invention. If the valves 11 and 19 be now opened, a portion of the stream from the supply-pipe 9 will flow by the branch pipes 18 into the mixing-chamber 16 without coming into contact with the contents of the receptacle 1. The other portion of the stream, however, will pass into the receptacle 1 through the small port or opening 13 into the receptacle and will be impregnated by the poison contained in the latter and will be forced through the discharge-pipe 14 into the mixing-chamber 16, where it will mingle and mix with the clear water flowing from the pipes 18, and the poisonous mixture will finally be discharged by the nozzle 15 onto the trees or plants. It will be apparent that the force or volume of the stream discharged onto the plants may be regulated and controlled by means of the valve 11 without interfering or affecting the relative proportions in which the clear water and poison solution are commingled in the mixing-chamber and that by means of the valve 19 the quantity of such poison solution admitted to the mixing-chamber may be increased or diminished at will. Furthermore, should it be desired to cut off the poison solution entirely and discharge only clear or unimpregnated water from the nozzle 15 it is only necessary to completely close the valve 19, when no water will pass through the receptacle 1, the entire stream passing to the nozzle through the branch pipes 18. When some kinds of insecticides are employed, it will not be necessary to actuate the agitator, the slight obstruction offered by the skeleton structure of the agitator being alone sufficient to cause the water and insecticide to thoroughly commingle, but with other kinds of insecticides—as paris-green, for example—it is necessary for the operator to rotate the agitator by means of the crank 8, thus stirring up the insecticide and mixing it with the water in the receptacle.

I have shown my improved insect-destroyer in a simple and its preferred form; but it will be manifest to those skilled in the art that many changes or alterations may be made in the details of its construction and arrangement without departing from the spirit of my invention, and I therefore wish it to be understood that I do not confine myself to such details excepting in the manner hereinafter specifically pointed out in the following claims.

Having described my invention, what I claim is—

1. In a device of the character described the combination with a receptacle adapted to contain a suitable material and provided with a fluid supply and discharge pipe, of a nozzle in the discharge-pipe, a branch pipe leading from the supply-pipe to the discharge-nozzle, an adjustable valve in the discharge-pipe for regulating or entirely cutting off the flow of liquid from the discharge-pipe to the discharge-nozzle, and a diaphragm in the supply-pipe between the branch pipe and the receptacle, and having a relatively small aperture, substantially as described.

2. In a device of the character described the combination with a receptacle adapted to contain a suitable material, and provided with a fluid supply and discharge pipe, of a discharge-nozzle on the discharge-pipe, an adjustable valve arranged in the discharge-pipe, a branch pipe leading from the supply-pipe to the discharge-nozzle, and a valve in the supply-pipe arranged to control the fluid to both the supply and branch pipes, substantially as described.

3. In a device of the character described the combination with a receptacle adapted to contain a suitable material, and provided with a fluid supply and discharge pipe, of a manually-actuated agitator in the receptacle, a discharge-nozzle on the discharge-pipe, a branch pipe leading from the supply-pipe to the discharge-nozzle, and a diaphragm in the supply-pipe between the branch pipe and the receptacle, and having a relatively small aperture, substantially as described.

4. In a device of the character described the combination with a receptacle adapted to contain a suitable material, and provided with a fluid supply and discharge pipe, of a discharge-nozzle on the discharge-pipe, a branch pipe leading from the supply-pipe to the discharge-nozzle, a valve for controlling the passage of the fluid through both the supply and branch pipes, a valve for regulating the passage of the fluid through the discharge-pipe to the nozzle, and a diaphragm in the supply-pipe between the branch pipe and the receptacle, and having a relatively small aperture, substantially as described.

5. In a device of the character described the combination with a receptacle adapted to contain a suitable material and provided with a fluid supply and discharge pipe, of a mixing-chamber on the end of the discharge-pipe, branch pipes leading from the supply-pipe around the receptacle to the mixing-chamber, an agitator in the receptacle, means for regulating or entirely shutting off the flow of liquid from the receptacle to the mixing-chamber, and a diaphragm arranged in the supply-pipe between the branch pipe and the receptacle, and having a relatively small aperture, substantially as described.

6. In a device of the character described, the combination with a cylindrical receptacle provided on one side intermediate its ends with a fluid-supply pipe and on its opposite side with a discharge-pipe, a mixing-chamber on the end of the discharge-pipe, branch pipes leading around opposite sides of the receptacle and each respectively connected at its ends to the supply-pipe and mixing-chamber, a diaphragm in the supply-pipe between the branch pipes and the receptacle and having a relatively small aperture, and a valve arranged in the discharge-pipe and operating to control the flow of liquid from the latter to the mixing-chamber, substantially as described.

In testimony whereof I have hereunto set my hand in presence of two subscribing witnesses.

ROBT. A. McCRONE.

Witnesses:
BERTHA MILLER,
H. B. BEACH.